United States Patent Office 3,283,803
Patented Nov. 8, 1966

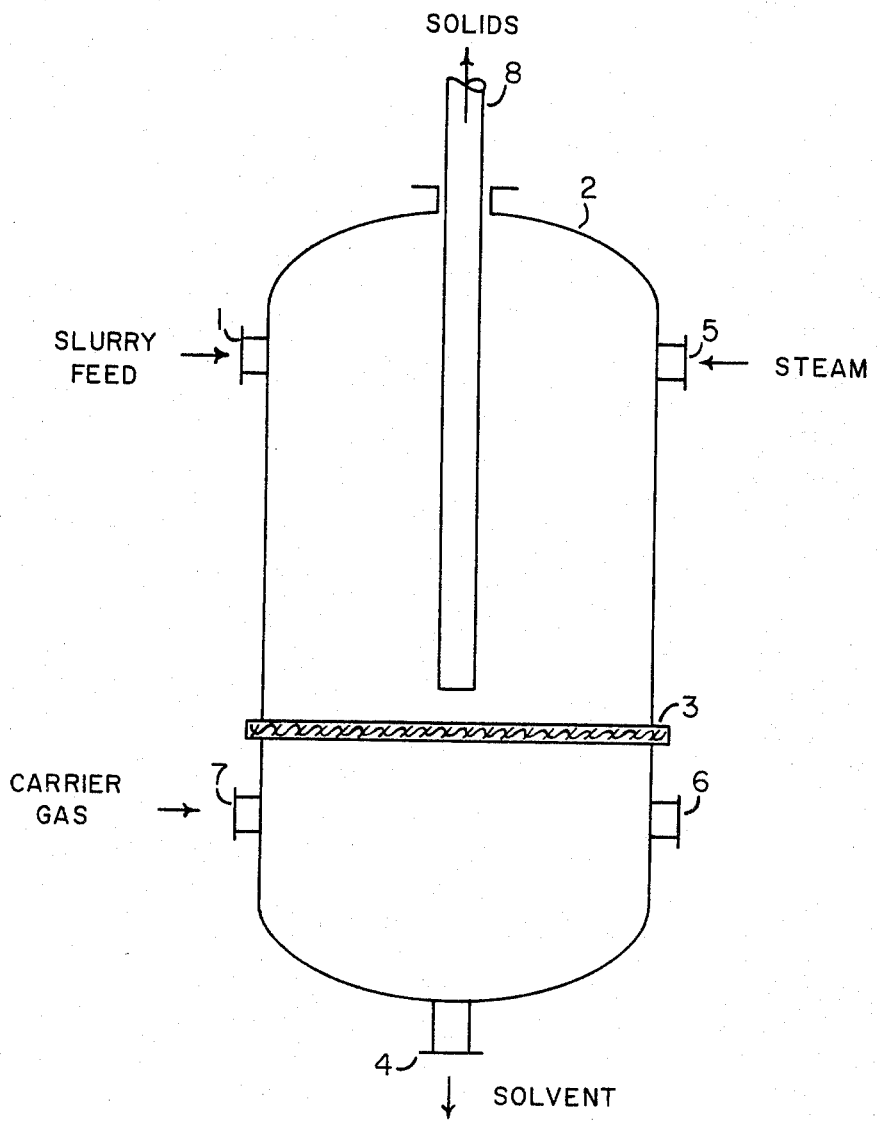

3,283,803
SEPARATION OF SLURRIES
Victor D. Phillips, Jr., and Martin M. McLane, Texas City, Tex., assignors to Monsanto Company, St. Louis, Mo., a corporation of Delaware
Filed Jan. 7, 1963, Ser. No. 249,703
5 Claims. (Cl. 159—47)

The present invention relates to a process for the separation of solids from liquids. More particularly the present invention relates to a method for the recovery of a solid adsorbent from a slurry containing the adsorbent and an organic liquid.

The recovery of solids or liquids from slurries is a very common unit operation in the chemical industry. Generally, this involves several steps such as filtration, washing, drying and subsequent conveying of the solids. It is also usual for a series of these steps to be repeated so that removal of the liquid medium from the solid cake is complete. A number of different means for performing these tasks have been used in the past, for instance, filter presses, centrifuges, tumblers and multiple-effect evaporators. This overall operation of recovering solids or liquids from a slurry is quite expensive, however, and new methods of accomplishing this have continually been sought.

Many organic liquids, for instance, acrylonitrile, styrene or vinyl chloride, are treated in their liquid state with solids to remove impurities or in many cases the impurities are removed by another liquid which must then be removed from the organic liquid by a solid adsorbent. The problem then arises as to what means can be used to recover the solid adsorbent without excessive loss of the organic liquid. One such process wherein a solid adsorbent must be removed from an organic liquid is in the removal of impurities, such as carbonyl impurities, from acrylonitrile by contacting alumina or carbon with the acrylonitrile to form a slurry and thereafter attempting to recover the solid adsorbent free of acrylonitrile for regeneration and reuse.

The separation and recovery of solid adsorbents or liquids from liquid slurries containing the same is difficult and expensive. The particles of adsorbents may tend to adhere together to form agglomerates, particularly as the liquid is removed, and thereby greatly impede the further processing of the adsorbents. Also, the adsorbents contain an occluded solvent which is not readily removed by heat or stripping with an inert gas. Furthermore, the solid adsorbents from which the solvent has been removed cannot be readily conveyed to the subsequent regeneration step until substantially all the solvent has been removed.

A preferred method for the separation and recovery of solid adsorbents from slurries containing the same involves filtering of the solids from the liquid of the slurry, removing or displacing the liquid adsorbed on the surface of the adsorbents, and drying the adsorbents. Each of these steps is ordinarily conducted separately, resulting in extremely high processing costs.

It has now been discovered that granular adsorbents can be readily separated from liquid slurries containing the same and the adsorbents and liquid recovered separately by subjecting the slurries containing the granular adsorbents to a single treatment involving sequentially filtering, removing adsorbed liquid, and drying the adsorbents in a single vessel, and thereafter conveying the adsorbents directly to a regeneration step.

It is, therefore, the object of this invention to provide a process for the recovery of solids from a slurry containing said solids. Another object of this invention is to provide a method for separating granular solid adsorbents from an organic slurry containing the same by the steps of filtering, stripping and drying in a single operation. It is a further object of this invention to separate granular solid adsorbents from an organic slurry containing the same in a form for ready conveyance to subsequent steps for regeneration of the adsorbents. An additional object of the invention is to recover solid adsorbents from a slurry of an organic monomer and said adsorbent by a novel unit operation involving a combination of filtering, stripping, drying and conveying of the solid adsorbents. These and other objects will become apparent from the following description of the invention and the attached drawing.

According to the present invention, solid adsorbents are recovered in a single operation in a form for ready conveyance and organic solvents are recovered in a substantially pure state from a slurry of granular solid adsorbent and organic solvent by sequentially filtering said slurry to separate said adsorbent from said organic solvent, displacing the adsorbed solvent from the surface of said solid adsorbent by contact with an inert fluid medium such as steam, optionally drying said solid adsorbent to remove adsorbed inert fluid medium from the surface of said solid adsorbent and thereafter conveying said solid adsorbent to another location by means of a gas.

In a specific embodiment of the invention wherein solid adsorbents are separated from a hydrocarbon monomer, solid adsorbents are recovered from a slurry of acrylonitrile and said adsorbents by feeding the slurry to a vessel wherein the solvent is removed from the adsorbent by filtration and steaming, the recovered adsorbent material is dried by the use of an inert fluid, such as nitrogen or air or perhaps superheated steam in some cases, and thereafter the adsorbent is conveyed by means of a gas.

The attached drawing depicts the vessel and the various attachments which are required to carry out the improved process of this invention. In the drawing, the slurry of organic solvent and solid adsorbent is fed into vessel 2 via line 1 until a certain level is reached. The organic solvent is filtered through the filter medium 3 by the pressure of steam inside the vessel from inlet 5 or by gas pressure or gravity depending on the organic solvent and solid adsorbent present. Liquid organic solvent drains through line 4 and is recovered while the solid adsorbent material remains on the filter medium. Steaming under pressure is continued until all the organic solvent is steam stripped from the solid adsorbent. This steaming operation may be either downflow or upflow depending on the operation used. When the adsorbent has been completely stripped of solvent and is relatively dry, a vacuum may be applied via line 6 and water can be flashed to decrease the moisture content if desired, or hot inert gases may be passed through the solid adsorbent, if drying is needed. This step may be eliminated under some conditions, however. Gas pressure is then directed into the vessel through line 7 and the solid adsorbent is fluidized and conveyed through line 8 to the next process step, for instance, regeneration for reuse. Thus, as evidenced from the drawing, vessel 2 is divided by filter medium 3 into a high pressure zone into which steam is introduced through inlet 5 and a low pressure zone from which solvent is withdrawn through outlet 4.

From the above description, it is apparent that the difficult problems of filtering, stripping, drying and conveying a solid adsorbent is conveniently done in a novel operation which is essentially one process operation because of the unique combination of steps which are used.

The entire process operation is usually carried out at a temperature of about 40° C. to 130° C. although temperatures in the range from about 10° C. to about 200° C. can advantageously be employed. A relatively low pressure is generally used to accomplish the results desired. A steam or gas pressure of approximately 5 to 30 p.s.i.g. is preferred although it is possible that pressures in the range from about 1 to about 100 p.s.i.g. or higher can be employed.

The process of this invention is applicable to any slurry containing a solid adsorbent in any organic solvent. It is particularly applicable to slurries of a solid adsorbent and vinyl monomers such as acrylonitrile; styrene; vinyl halides, for instance, vinyl chloride; vinylidene chloride; methylacrylonitrile; alkyl substituted styrenes, such as alpha methyl styrene; and others. The solid adsorbent to which this invention is directed in any adsorbent which may be employed to remove impurities, particularly oxygenated impurities such as carbonyl compounds, from any of the above noted monomers. Such adsorbents include alumina, silica, silica gel, carbon, various clays, and other common adsorbents.

The ordinary slurry consisting of organic solvent and a solid adsorbent is usually predominantly organic solvent, that is, in the order of 60 to 90 percent organic solvent and 40 to 10 percent by weight solid adsorbent. A weight ratio of 80% organic solvent and 20% solid adsorbent is commonly employed. However, the process and equipment described in this invention can be successfully employed with any slurry of a content in the range of from 10 to 95 percent organic solvent.

Although it could be arranged so that the feed of organic solvent and solid adsorbent slurry to a series of vessels would be continuous, the operation of each filtering vessel itself must necessarily be a batch operation. This can be clearly seen from the description of the process which requires almost complete removal of the organic solvent from the solid adsorbent, that is, down to no more than about 1.0 weight percent solvent. The solid adsorbent should contain no more than about 5% to 10% water by weight when it is gas conveyed to the next treating step.

It is important in the steam stripping operation to remove as much of the organic solvent as possible. The solvent content of the solid absorbent after steam stripping must be less than 1% by weight but preferably should be less than 0.1% by weight.

The residence time for the above described adsorbent-solvent slurries in the apparatus of this invention is an important process factor but is not critical to the invention. A residence time in the range of from about 5 minutes to about 1 hour can be employed in the practice of this process depending on the solid adsorbent to be separated and the organic liquid with which the slurry is composed. To capitalize on the advantages of this process, however, and for economy of operation, it is preferred that the residence time be a minimum. Generally, it can be expected that for the organic solvents and solid adsorbents exemplified a residence time of from about 10 minutes to about 40 minutes will be required to accomplished the desired separation and recovery of the solid adsorbent.

Although an inert gas such as nitrogen is preferred to fluidize and convey the granulated solid adsorbent, any gas which does not degrade or react with the solid adsorbent itself can be employed. For example, air may be used. The pressure which is required to accomplish this step is from about 1 to about 50 p.s.i.g. depending upon moisture content in the solid adsorbent, the lift and conveying distance required.

Although the conveying steps exemplified in this invention are of the type classed as dense-phase conveying, that is, conveying by use of gas pressure, other types of conveying are construed as being within the scope of this invention. An example of such a conveying step would be a gas driven booster-jet conveying. If desired the conveying step may be conducted by the application of a vacuum to the solid adsorbent outlet line although the use of pressure to fluidize the granulated solid adsorbent is definitely preferred.

Any convenient type of filter media can be utilized in the filtration operation of this invention but when processing organic solvent-adsorbent slurries, metal screens such as stainless steel, steel, aluminum, or other metal screens are particularly desirable, although it is possible to use non-wettable synthetic fibers such as nylon, Dacron, or linear olefinic polymer fibers and natural fibers is treated to repeal moisture so they are essentially non-wettable. Although only a flat filter is exemplified in the example, any configuration of filter such as cylindrical may be employed.

The essential steps described in the foregoing specification are easily recognized as forming or feeding a slurry to the apparatus of the invention, filtering the organic solvent from the solid adsorbent, stripping the residual organic solvent from the solid adsorbent, drying, if needed, the solid adsorbent to reduce the water content and thereafter conveying the solid adsorbent to the next process step. It is understood, however, that a number of other operations may be conducted in the apparatus described without departing from the scope of the invention. For intsance, some processes may require additional steps such as vacuum flashing or washing and may indeed include quenching of a reaction to form the slurry or perhaps even conducting the reaction step itself.

As will be recognized by those skilled in the art, the various process steps described above can be conducted in various modes and manners other than the preferred method recited. For instance, the filtering step can be accomplished either by gravity filtration in some cases or by the preferred application of pressure as exemplified in the example. In addition, the filtering step may involve the sequential separation of organic solvent and stripping with an inert gas such as steam or may involve the simultaneous removal of organic solvent and replacement with, for instance, steam. The displacement of residual liquid from the solid adsorbent might be accomplished either by the preferred use of steam or by an inert gas introduced above or below the filtered solid adsorbent as the requirements of the operation might dictate. In the drying step, as has been recited above, the solid adsorbent may be reduced in moisture content by the application of vacuum, either above or below the filtered solid adsorbent, or by the use of heat, for instance, a hot gas being passed through the solid adsorbent, or in some cases, by the use of superheated steam.

It has been consistently stated throughout the description of the invention that the material to be processed is a slurry containing solid adsorbent and an organic solvent. It is to be understood that the broad definition of slurry includes such terms as suspension and solid-liquid mixtures. The essential consideration is that the material to be treated be of a composition such that the solid adsorbents are filterable from the organic solvent.

The following example is presented to illustrate the process of the invention but is not to be construed as limiting it in any manner whatsoever.

*Example I*

Water-free alumina pellets were utilized as solid adsorbent wherein acrylonitrile was passed over the alumina to remove certain undesirable impurities, for instance, oxygenated impurities such as carbonyl compounds. The alumina moved continuously from one section to the next in the removal process for approximately ten hours. The spent alumina was removed from the bottom of the adsorbent vessel in a slurry of acrylonitrile and alumina. This slurry was pumped into the apparatus of the present invention in a batch operation and when the slurry level reached a certain height, steam pressure of about 25 p.s.i.g. was applied to filter acrylonitrile through the filter medium composed of 200 mesh stainless steel screen. Subsequent to filtering, steam pressure was maintained inside the vessel to strip all of the adsorbed acrylonitrile from the alumina pellets. The temperature of the alumina during the steaming operation rose to approximately 140° C. and the water content of the alumina after a period of steaming was approximately 10%. The steam was shutoff and a nitrogen pressure of approximately 35 p.s.i.g. was applied whereupon the alumina was fluidized and conveyed through the dip pipe to a subsequent process for the regeneration of the alumina.

What is claimed is:

1. A method for separating granular solid adsorbent from a slurry containing said solid adsorbent and from 10 to 95% of an organic solvent in a single operation in a pressure vessel having a filter screen dividing said pressure vessel into low and high pressure zones and recovering said granular solid absorbent in a form for ready conveying containing less than 1% by weight of said solvent, said method comprising, in sequence, introducing said slurry into said pressure vessel into contact with a filter screen, filtering said slurry to remove a major portion of said organic solvent from said solid adsorbent, contacting the resultant solid adsorbent on said filter screen with an inert displacing fluid supplied to the high pressure side of said filter screen to remove the remaining organic solvent from said solid adsorbent, and introducing an inert gas into said pressure vessel on the low pressure side of said filter screen to remove the resulting solid adsorbent from said filter screen and transport the same from said pressure vessel in a finely divided form suspended in said inert gas.

2. The process of claim 1 wherein the solid adsorbent is alumina and the organic solvent is acrylonitrile.

3. The process of claim 1 wherein the slurry is comprised of about 60 to about 90% by weight of an organic solvent with the remainder being solid adsorbent.

4. The process of claim 2 wherein steam is the displacing fluid and the acrylonitrile content of the alumina is reduced to less than 1% by weight and the water content of the resulting granular alumina is less than 10% by weight.

5. The process of claim 1 wherein the temperature is in the range from about 10° C. to about 200° C. and the pressure is in the range from about 1 p.s.i.g. to about 100 p.s.i.g.

References Cited by the Examiner

UNITED STATES PATENTS

| | | | |
|---|---|---|---|
| 1,348,159 | 8/1920 | Down | 210—68 |
| 2,301,803 | 11/1942 | Davis | 210—68 |
| 2,550,374 | 4/1951 | Palmer | 34—57 X |
| 2,824,646 | 2/1958 | Willenborg | 210—68 |
| 2,836,615 | 5/1958 | Heininger et al. | 260—465.9 |

FOREIGN PATENTS 835,216  5/1960  Great Britain.

OTHER REFERENCES

Perry et al.: "Chemical Engineer's Handbook," 1950, pages 834–838, 875–877.

CHARLES B. PARKER, *Primary Examiner.*